US012388203B2

(12) United States Patent
Yamanaka et al.

(10) Patent No.: US 12,388,203 B2
(45) Date of Patent: Aug. 12, 2025

(54) PRESS-FIT TERMINAL AND CONNECTOR DEVICE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Takuya Yamanaka, Yokkaichi (JP); Tetsuya Ito, Yokkaichi (JP); Toshikazu Sakurai, Yokkaichi (JP); Takashi Tonosaki, Yokkaichi (JP); Tetsuya Shinozaki, Yokkaichi (JP); Shigeki Shimada, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 396 days.

(21) Appl. No.: 17/912,359

(22) PCT Filed: Mar. 10, 2021

(86) PCT No.: PCT/JP2021/009579
§ 371 (c)(1),
(2) Date: Sep. 16, 2022

(87) PCT Pub. No.: WO2021/199994
PCT Pub. Date: Oct. 7, 2021

(65) Prior Publication Data

US 2023/0111250 A1 Apr. 13, 2023

(30) Foreign Application Priority Data

Mar. 30, 2020 (JP) ................................ 2020-060746

(51) Int. Cl.
*H01R 12/58* (2011.01)

(52) U.S. Cl.
CPC ................................ *H01R 12/585* (2013.01)

(58) Field of Classification Search
CPC .. H01R 12/585; H01R 12/716; H01R 12/724; H01R 12/58; H01R 13/6587; H01R 12/57; H01R 24/50; H01R 12/7082
See application file for complete search history.

(56) References Cited

U.S. PATENT DOCUMENTS 10,096,917 B1 * 10/2018 Myer .................... H01R 43/16
10,547,128 B1 * 1/2020 Lin ..................... H01R 12/585
(Continued)

FOREIGN PATENT DOCUMENTS

CN 109792113 A 5/2019
JP 2005-228710 A 8/2005
(Continued)

OTHER PUBLICATIONS

May 18, 2021, International Search Report issued in Patent Application No. PCT/JP2021/009579.
(Continued)

*Primary Examiner* — Truc T Nguyen
(74) *Attorney, Agent, or Firm* — Oliff PLC

(57) ABSTRACT

A press-fit terminal includes a press-fit portion including two contact pieces facing each other with an eyehole interposed therebetween, where each of the two contact pieces includes a parallel portion, a front spring portion extending from the parallel portion in a direction in which the press-fit portion is inserted, and a rear spring portion extending from the parallel portion in a direction opposite to the direction in which the press-fit portion is inserted, the two parallel portions being parallel to each other, a thickness of the press-fit portion is 0.3 mm or more and 0.5 mm or less, when
(Continued)

a length of the eyehole is Le [mm] and a length of the parallel portion is Ls [mm], Ls/Le is 0.57 or more and 0.65 or less, and when front spring strength is $G_1$ [$mm^3$] and rear spring strength is $G_2$ [$mm^3$], $G_1/G_2$ is 0.55 or more and 1.45 or less.

5 Claims, 5 Drawing Sheets

(56) References Cited

U.S. PATENT DOCUMENTS 10,756,009 B1 * 8/2020 Hoffmeyer ............. H05K 3/308
11,431,141 B1 * 8/2022 Schneider .............. H01R 43/16
2004/0242033 A1 * 12/2004 Hu ....................... H01R 12/585 439/82
2005/0090155 A1 * 4/2005 Blossfeld ............... H01R 13/41 439/751
2005/0176267 A1 * 8/2005 Saitoh .................... H01R 13/03 439/49
2006/0264076 A1 * 11/2006 Chen .................... H01R 12/585 439/82
2006/0292934 A1 * 12/2006 Schell .................. H01R 12/737 439/660
2007/0093143 A1 * 4/2007 Nomura ................. H05K 3/308 439/751
2007/0099448 A1 * 5/2007 Taylor .................... H05K 1/141 439/73
2007/0155255 A1 * 7/2007 Galauner ................. H01R 4/18 361/823
2008/0166928 A1 * 7/2008 Tang ...................... H05K 3/308 439/751
2008/0318453 A1 12/2008 Dancison
2011/0217883 A1 9/2011 Kawai et al.
2020/0021047 A1 1/2020 Kishibata et al.
2020/0044373 A1 2/2020 Yamanaka et al.

FOREIGN PATENT DOCUMENTS

JP 2007-328924 A 12/2007
JP 2008-165987 A 7/2008
JP 2009-021238 A 1/2009
JP 2011-187196 A 9/2011
JP 2011-210375 A 10/2011
JP 2015-076317 A 4/2015
JP 2020-013641 A 1/2020
WO 2008/038331 A1 4/2008

OTHER PUBLICATIONS

Jun. 11, 2025 Office Action issued in Chinese Patent Application No. 20218023692.X.

* cited by examiner

FIG. 7

| | EXAMPLE 1 | EXAMPLE 2 | EXAMPLE 3 | EXAMPLE 4 | EXAMPLE 5 | EXAMPLE 6 | EMBODIMENT EXAMPLE 1 | EMBODIMENT EXAMPLE 2 | EXAMPLE 7 | EXAMPLE 8 | EXAMPLE 9 | EXAMPLE 10 | EXAMPLE 11 |
|---|---|---|---|---|---|---|---|---|---|---|---|---|---|
| Ls/Le | 0.56 | 0.56 | 0.56 | 0.56 | 0.63 | 0.63 | 0.63 | 0.63 | 0.63 | 0.66 | 0.66 | 0.66 | 0.66 |
| G1/G2 | 0.241 | 0.581 | 0.978 | 1.376 | 0.317 | 0.534 | 0.754 | 1.056 | 1.470 | 0.321 | 0.638 | 0.898 | 1.262 |
| INSERTION FORCE [N] | 40.6 | 41.9 | 45.8 | 48.5 | 54.2 | 54.7 | 56.9 | 62.2 | 66.6 | 61.6 | 61.9 | 66.9 | 70.6 |
| HOLDING FORCE [N] | 17.4 | 16.2 | 14.7 | 13.9 | 17.3 | 18.8 | 21.3 | 20.5 | 22.0 | 18.2 | 22.2 | 23.3 | 25.0 |
| CONTACT AREA [$mm^2$] | 0.31 | 0.27 | 0.28 | 0.29 | 0.34 | 0.39 | 0.50 | 0.50 | 0.51 | 0.38 | 0.48 | 0.50 | 0.58 |
| G=G1+G2 | 0.025 | 0.020 | 0.019 | 0.018 | 0.044 | 0.038 | 0.036 | 0.0341 | 0.0338 | 0.055 | 0.045 | 0.043 | 0.041 |

PRESS-FIT TERMINAL AND CONNECTOR DEVICE

TECHNICAL FIELD

The present disclosure relates to a press-fit terminal and a connector device.

BACKGROUND ART

Patent Document 1 discloses a press-fit terminal including a connection portion having a width to penetrate across front and back surfaces and including a slit portion and two beam members facing each other with the slit portion therebetween. In Patent Document 1, the beam member is formed to have thicknesses at the front end side and the rear end side of the connection portion thinner than the thickness at the center of the connection portion, and the slit portion is formed to have a length from the center to the rear end side of the connection portion shorter than the length from the center to the front end side.

Patent Document 2 discloses a press-fit terminal including a guiding portion which is guided into a through hole, a pressure keeping portion connected to the guiding portion and press-fitted to be held in the through hole, and a main body portion connected to the pressure keeping portion, in which an opened portion extending in a longitudinal direction from the center of the pressure keeping portion to the main body portion side and guiding portion side is formed. In Patent Document 2, the ratio between the length in the longitudinal direction from the center of the pressure keeping portion to one end of the opened portion on the main body portion side and the length in the longitudinal direction from the center of the pressure keeping portion to the other end of the opened portion on the guiding portion side is defined within a range from 80:220 to 120:180.

PRIOR ART DOCUMENTS

Patent Documents

Patent Document 1: International Publication WO 2008/038331

Patent Document 2: Japanese Patent Application Laid-Open No. 2008-165987

SUMMARY OF THE INVENTION

Problem to be Solved by the Invention

A press-fit terminal is evaluated by, for example, insertion force and holding force. The insertion force is a load necessary for inserting a press-fit terminal into a through hole. The holding force is a load necessary for pulling out the press-fit terminal from the through hole. It is desired that the press-fit terminal be easily inserted in the through hole and be hardly removed from the through hole. Therefore, the press-fit terminal is required to have a small insertion force and a large holding force.

In recent years, downsizing of a connector into which a press-fit terminal is incorporated, downsizing of a substrate into which a press-fit terminal is press-fitted, and densification of a press-fit terminal are required. Accordingly, reduction in the diameter of a through hole and reduction in the thickness of a press-fit terminal are required.

As described above, there is still room for further improvement in compatibility between reduction in insertion force and increasing of holding force of a thin press-fit terminal.

An object of the present disclosure is to raise compatibility between reduction in insertion force and increasing of holding force.

Means to Solve the Problem

A press-fit terminal according to the present disclosure is a press-fit terminal that is press-fitted into a through hole formed in a substrate and includes a press-fit portion including two contact pieces facing each other with an eyehole interposed therebetween, wherein each of the two contact pieces includes a parallel portion, a front spring portion extending from the parallel portion in a direction in which the press-fit portion is inserted, and a rear spring portion extending from the parallel portion in a direction opposite to the direction in which the press-fit portion is inserted, the two parallel portions being parallel to each other, a thickness of the press-fit portion is 0.3 mm or more and 0.5 mm or less, in the press-fit portion, when a length of the eyehole is Le [mm] and a length of the parallel portion is Ls [mm], Ls/Le is 0.57 or more and 0.65 or less, and in the press-fit portion, when a front spring strength and a rear spring strength calculated under conditions described below are respectively $G_1$ [$mm^3$] and $G_2$ [$mm^3$], $G_1/G_2$ is 0.55 or more and 1.45 or less:

[Conditions]

- A direction in which the press-fit terminal is inserted is a forward direction, and a direction opposite to the direction in which the press-fit terminal is inserted is a rearward direction;
- A position at 0.1 mm in the rearward direction from the front end of the eyehole is a front reference, and a position at 0.1 mm in the forward direction from the rear end of the eyehole is a rear reference;
- Assuming a front reference plane extending from an inner edge of the front spring portion at the front reference and perpendicular to an outer edge of the front spring portion, the second moment of area of the front spring portion in the front reference plane is defined as $I_1$ [mm];
- Assuming a rear reference plane extending from an inner edge of the mar spring portion at the rear reference and perpendicular to an outer edge of the rear spring portion, the second moment of area of the rear spring portion in the rear reference plane is $I_2$ [$mm^4$];
- A length of the press-fit portion in the insertion direction from an end, on the front spring portion side, of a linear outer edge of the parallel portion to the front end of the eyehole is $L_1$ [mm];
- A length of the press-fit portion in the insertion direction from an end, on the rear spring portion side, of a linear outer edge of the parallel portion to the rear end of the eyehole is $L_2$ [mm];
- Front spring strength $G_1$ is $I_1/L_1$ [$mm^3$], and rear spring strength $G_2$ is $I_2/L_2$ [$mm^3$].

Effects of the Invention

According to the present disclosure, compatibility between reduction in insertion force and increasing of holding force can be raised.

BRIEF DESCRIPTION OF DRAWINGS

FIG. 7 is a view illustrating evaluation results of the press-fit terminal.

DESCRIPTION FOR CARRYING OUT THE INVENTION

Description of Embodiments of Present Disclosure

Figure 1:
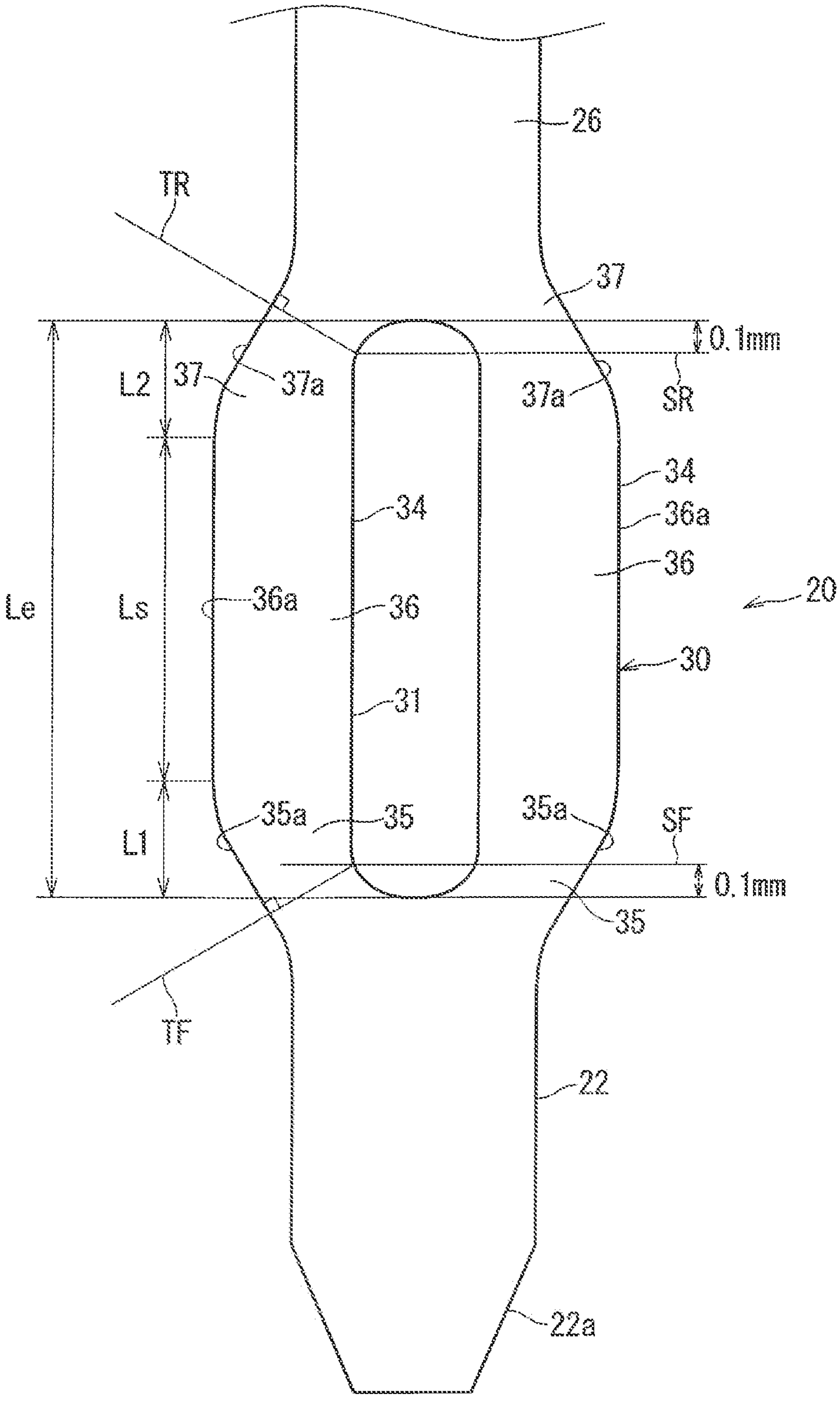
FIG. 1 is front view illustrating a press-fit terminal according to an embodiment.

First, a series of embodiments of the present disclosure will be described.

A press-fit terminal of the present disclosure is as follows.

(1) A press-fit terminal that is press-fitted into a through hole formed in a substrate includes a press-fit portion including two contact pieces facing each other with an eyehole interposed therebetween, wherein each of the two contact pieces includes a parallel portion, a front spring portion extending from the parallel portion in a direction in which the press-fit portion is inserted, and a rear spring portion extending from the parallel portion in a direction opposite to the direction in which the press-fit portion is inserted, the two parallel portions being parallel to each other, a thickness of the press-fit portion is 0.3 mm or more and 0.5 mm or less, in the press-fit portion, when a length of the eyehole is Le [mm] and a length of the parallel portion is Ls [mm], Ls/Le is 0.57 or more and 0.65 or less, and in the press-fit portion, when a front spring strength and a rear spring strength calculated under conditions described below are respectively $G_1$ [mm$^3$] and $G_2$ [mm$^3$], $G_1/G_2$ is 0.55 or more and 1.45 or less:

[Conditions]

A direction in which the press-fit terminal is inserted is a forward direction, and a direction opposite to the direction in which the press-fit terminal is inserted is a rearward direction;

A position at 0.1 mm in the rearward direction from the front end of the eyehole is a front reference, and a position at 0.1 mm in the forward direction from the rear end of the eyehole is a rear reference;

Assuming a front reference plane extending from an inner edge of the front spring portion at the front reference and perpendicular to an outer edge of the front spring portion, the second moment of area of the front spring portion in the front reference plane is defined as $I_1$ [mm$^4$];

Assuming a rear reference plane extending from an inner edge of the rear spring portion at the rear reference and perpendicular to an outer edge of the rear spring portion, the second moment of area of the rear spring portion in the rear reference plane is $I_2$ [mm$^4$];

A length of the press-fit portion in the insertion direction from an end, on the front spring portion side, of a linear outer edge of the parallel portion to the front end of the eyehole is $L_1$ [mm];

A length of the press-fit portion in the insertion direction from an end, on the rear spring portion side, of a linear outer edge of the parallel portion to the rear end of the eyehole is $L_2$ [mm];

Front spring strength $G_1$ is $I_1/L_1$ [mm$^3$], and rear spring strength $G_2$ is $I_2/L_2$ [mm$^3$].

Since Ls/Le is 0.57 or more and 0.65 or less and $G_1/G_2$ is 0.55 or more and 1.45 or less, compatibility between reduction in insertion force and increasing of holding force can be raised.

(2) The press-fit terminal according to (1), wherein when spring strength G [mm$^3$] is $G_1+G_2$, G may be 0.03 mm$^3$ or more and 0.04 mm$^3$ or less. Compatibility between reduction in insertion force and increasing of holding force can be further raised.

(3) The press-fit terminal according (1) or (2), wherein the outer edge of the front spring portion may be inclined so as to be directed inward in a width direction of the press-fit portion toward a front side, and the outer edge of the rear spring portion may be inclined so as to be directed inward in the width direction of the press-fit portion toward the rear side. This makes the front spring portion and the rear spring portion to deform easily.

(4) The press-fit terminal according to any one aspect of (1) to (3), wherein an outward portion of the parallel portion may be formed in an arc shape in a view looking along the insertion direction. This increases the contact area with which the inner peripheral surface of the through hole makes contact.

(5) A connector device that may include a connector including the press-fit terminal according to (4), and a substrate in which a through hole is formed, wherein the press-fit portion of the press-fit terminal may be press-fitted into the through hole, and a radius of curvature of the outward portion of the parallel portion may be equal to or smaller than an inner peripheral radius of the through hole in a view looking along the insertion direction. This increases the contact area between the press-fit portion and the inner peripheral surface of the through hole.

Details of Embodiments of Present Disclosure

Specific examples of a press-fit terminal and a connector device of the present disclosure will be described below with reference to the drawings. Note that the present disclosure is not limited to these examples, but is indicated by the claims, and is intended to include meanings equivalent to the claims and all modifications within the scope of the meanings.

The press-fit terminal of the present disclosure is meaningful under the following background. That is, the press-fit terminal is required to satisfy all the characteristics of holding force, contact area, and insertion force at high levels. Here, the holding force and the insertion force are as already described above. The contact area is a contact area between the press-fit terminal and the through hole in a state where the press-fit terminal is inserted into the through hole of a substrate. In order to improve electrical connection, it is desirable that the contact area be as large as possible. In a state where the press-fit terminal is inserted into the through hole, the press-fit terminal serves as a kind of spring, and both sides of the press-fit terminal are pressed against the through hole. A harder spring of the press-fit terminal provides a larger holding force and a larger contact area but with a larger insertion force. Conversely, a softer spring of the press-fit terminal provides a smaller insertion force but with a smaller holding force and a smaller contact area. Thus, the holding force, the contact area, and the insertion force depend on the hardness of the spring, and the requirement for the holding force and the contact area and the requirement for the insertion force are in a trade-off relationship.

A shape that satisfies all the characteristics of holding force, contact area, and insertion force at high levels has been proposed. The thickness of a conventional press-fit terminal is about 0.64 mm. In view of the demand for downsizing, multipolarization, or the like of the press-fit terminal, reduction in the thickness of the press-fit terminal is required.

When designing the shape of a press-fit terminal having a small thickness (for example, 0.4 mm thickness), for example, instead of designing a brand new shape, a shape may be designed to be similar to and smaller than an existing shape. However, a press-fit terminal having a small thickness is also small in size in a front view. Moreover, when a press-fit terminal is to be manufactured from a metal plate by press work or the like, there is a size limit for working. For these reasons, it may be difficult to work a press-fit terminal into a shape similar to and smaller than an existing shape. Therefore, for a press-fit terminal having a small thickness, it is necessary to study a new shape.

Under the above-described background, in the present disclosure, for a press-fit terminal having a small thickness, a shape that can satisfy holding force, contact area, and insertion force at high levels has been studied, and as a result, the following shape of a press-fit terminal has been conceived.

EMBODIMENT

Figure 2:
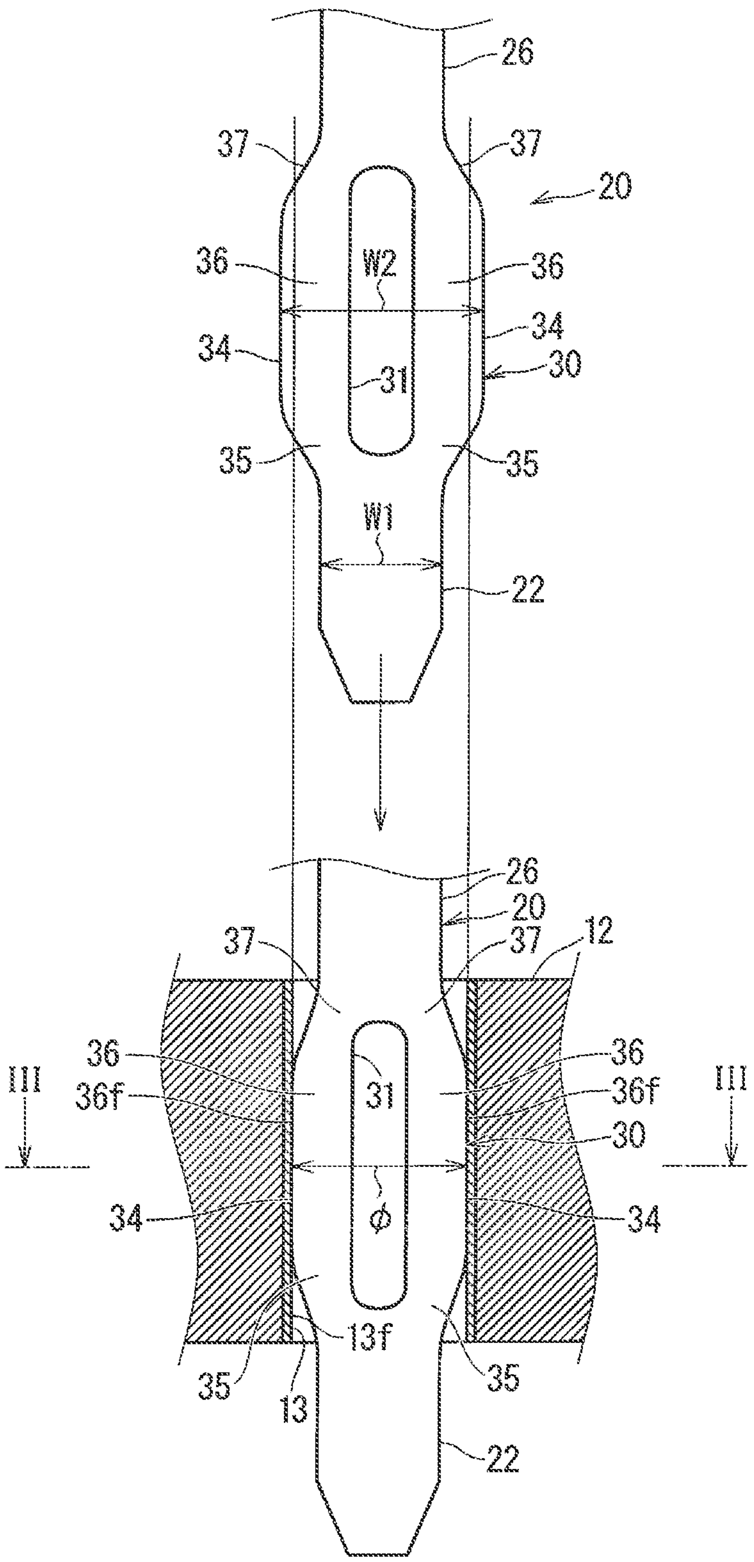
FIG. 2 is an explanatory view illustrating a state in which a press-fit portion is inserted into a through hole.
Figure 3:
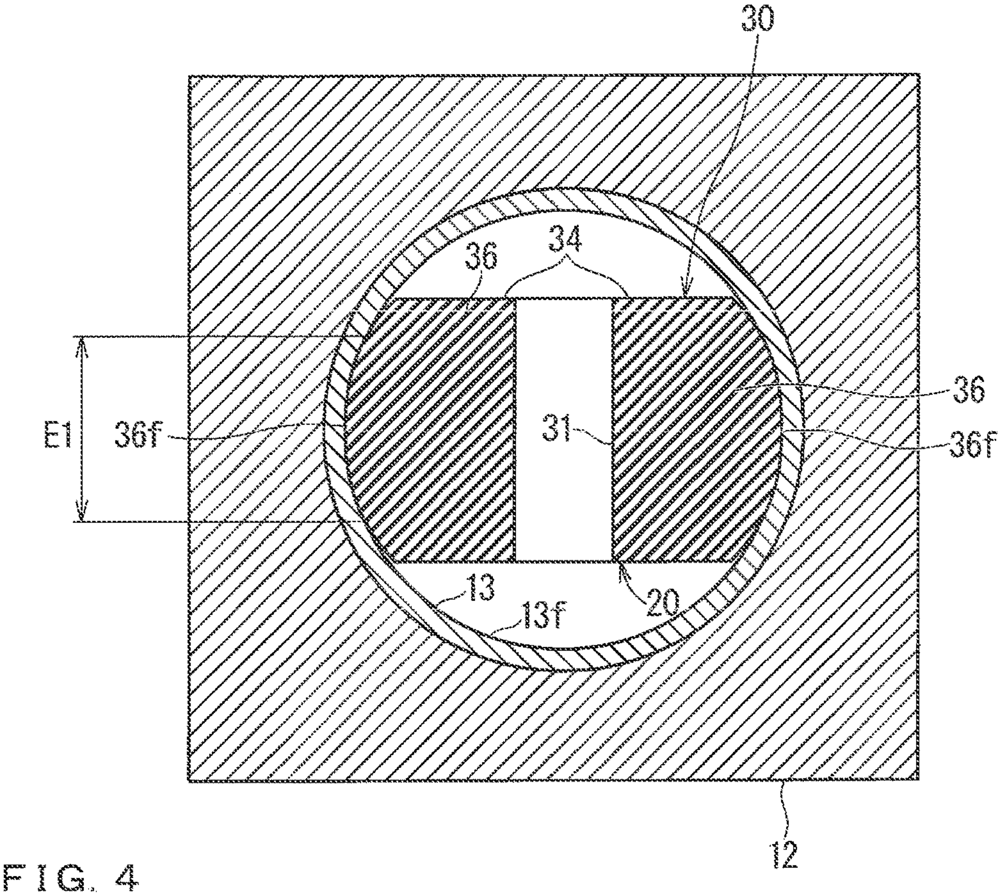
FIG. 3 is a cross-sectional view taken along line III-III in FIG. 2.

A press-fit terminal according to an embodiment will be described below. FIG. 1 is a front view illustrating a press-fit terminal 20. FIG. 2 is an explanatory view illustrating a state in which a press-fit portion 30 is inserted into a through hole 13. FIG. 2 illustrates the press-fit terminal 20 before being inserted into the through hole 13 and the press-fit terminal 20 inserted into the through hole 13. FIG. 3 is a cross-sectional view taken along line III-III in FIG. 2.

The press-fit terminal 20 is a terminal that is press-fitted into the through hole 13 formed in a substrate 12. Here, the substrate 12 is formed of an insulating plate, or the like, such as a glass epoxy plate. The through hole 13 is formed in the substrate 12 so as to penetrate from the frontside to the back side of the substrate 12. The through hole 13 is a circular hole. The through hole 13 may be a square hole, or the like. On the inner surface of the through hole 13, a conductive layer **13*f* of a metal such as copper is formed. In a state where the press-fit terminal 20 is press-fitted into the through hole 13, the press-fit terminal 20 is in contact with the conductive layer 13*f* and is electrically connected to the conductive layer 13*f*. The conductive layer 13*f* may be connected to a circuit formed on a surface, or the like, of the substrate 12**.

The press-fit terminal 20 is formed of a metal such as copper, a copper alloy, or the like. The press-fit terminal 20 may be formed by, for example, press-working a metal plate. Plating of tin, a tin alloy, or the like may be formed on a surface of the press-fit terminal 20.

The press-fit terminal 20 includes a press-fit portion 30. In the present embodiment, a distal portion 22 is continuous with one end portion of the press-fit portion 30, and a proximal portion 26 is continuous with the other end portion of the press-fit portion 30. The distal portion 22 is a portion that is first inserted into the through hole 13 when the press-fit terminal 20 is inserted into the through hole 13. The proximal portion 26 is a portion with which a portion to be electrically connected to the conductive layer **13*f* on the through hole 13 side is continuous. In an example illustrated in FIG. 6 described later, the proximal portion 26 is continuous with a connector terminal portion 54. A direction in which the press-fit portion 30** is inserted is a forward direction, and a direction opposite to the insertion direction is rearward direction.

The press-fit portion 30 is a portion provided between the distal portion 22 and the proximal portion 26. Width W2 (the maximum width in this case) of the press-fit portion 30 is larger than maximum width W1 of the distal portion 22 and also larger than diameter $\phi$ of the through hole 13. Therefore, the press-fit portion 30 can make contact with the inner peripheral surface of the through hole 13. The press-fit portion 30 may be grasped as a portion for obtaining electrical contact with the conductive layer **13*f* by keeping a contact state with the inner peripheral surface of the through hole 13**.

More specifically, the press-fit terminal 20 is formed as a whole in a linearly extending elongated plate shape.

The distal portion 22 includes a rectangular plate portion including a continuous constant width portion. Edges on both sides of the rectangular plate portion are parallel to each other. Width W1 of the distal portion 22 is smaller than the diameter (diameter) $\phi$ of the through hole 13. A most distal portion **22*a* which gradually becomes narrower toward the distal end side is provided at a distal portion (an end portion on a side opposite to the press-fit portion 30) of the rectangular plate portion of the distal portion 22. With presence of the most distal portion 22*a*, the press-fit terminal 20 is easily inserted into the through hole 13. The distal portion 22 can be inserted into the through hole 13 with a gap between the distal portion 22 and the inner peripheral surface of the through hole 13**.

The proximal portion 26 includes a rectangular plate portion including a continuous constant width portion. Edges on both sides of the rectangular plate portion are parallel to each other. The width of the proximal portion 26 is smaller than width W2 of the press-fit portion 30. Here, the width of the proximal portion 26 is the same as the maximum width W1 of the distal portion 22. The width of the proximal portion 26 may be different from the width of the distal portion 22.

The press-fit portion 30 is provided between the distal portion 22 and the proximal portion 26. The press-fit portion 30 includes two contact pieces 34 facing each other with the eyehole 31 therebetween. The eyehole 31 is a hole elongate along a direction from one of the distal portion 22 and the proximal portion 26 to the other. The shape of the eyehole 31 is specifically, for example, a true circle, an oval shape, a cube, or a rectangular parallelepiped. The eyehole 31 is preferably elongate along the direction in which the press-fit terminal is inserted. The contact piece 34 has a form of an elongate plate shape. One end portion of each of the two contact pieces 34 is continuous with the distal portion 22. Another end portion of each of the two contact pieces 34 is continuous with the proximal portion 26.

Each of the two contact pieces 34 includes a parallel portion 36, a front spring portion 35, and a rear spring portion 37.

The parallel portions 36 of the two contact pieces 34 are disposed parallel to each other. More specifically, the outer edges **36*a* of the two parallel portions 36 are disposed linearly along the front-rear direction and in parallel to each other. The inner edges of the two parallel portions 36 may also be disposed linearly along the front-rear direction and in parallel to each other. However, depending on the shape of the eyehole 31, some or all of the inner edges of the two parallel portions 36** may be curved.

The front spring portion 35 is a portion extending from the parallel portion 36 in a direction in which the press-fit terminal 20 is inserted (forward direction). The front spring portion 35 is a portion that deforms more easily than the parallel portion 36 when the press-fit portion 30 is inserted into the through hole 13. The outer edge 35*a* of the front spring portion 35 is inclined so as to be directed inward in the width direction of the press-fit portion 30 toward the front side. That is, the outer edge 35*a* of the front spring portion 35 is continuous with the outer edge 36*a* of the parallel portion 36 at the rear end thereof, gradually directed inward in the width direction of the press-fit portion 30 toward the front side, and continuous with the outer edge of the distal portion 22 at the front end thereof.

The outer edge 35*a* of the front spring portion 35 may be linear as a whole, may be a curve as a whole, or may have a shape of a combination of a straight line and a curve. The outer edge 35*a* of the front spring portion 35 and the outer edge 36*a* of the parallel portion 36 may be continuous with a curve therebetween, or may be continuous with a corner therebetween. Similarly, the outer edge 35*a* of the front spring portion 35 and the outer edge of the distal portion 22 may be continuous with a curve therebetween, or may be continuous with a corner therebetween. Here, a middle portion of the outer edge 35*a* of the front spring portion 35 forms a straight line, and both end portions thereof each form a curve.

The rear spring portion 37 is a portion extending from the parallel portion 36 in a direction opposite to the direction in which the press-fit terminal 20 is inserted (rearward direction). The rear spring portion 37 is a portion that deforms more easily than the parallel portion 36 when the press-fit portion 30 is inserted into the through hole 13. The front spring portion 35 and the rear spring portion 37 easily deform at front and rear sides of the parallel portion 36, so that the parallel portion 36 can be displaced inward without a large inclination. The outer edge 37*a* of the rear spring portion 37 is inclined so as to be directed inward in the width direction of the press-fit portion 30 toward the rear side. That is, the outer edge 37*a* of the rear spring portion 37 is continuous with the outer edge 36*a* of the parallel portion 36 at the front end thereof, gradually directed inward in the width direction of the press-fit portion 30 toward the rear side, and continuous with the outer edge of the proximal portion 26 at the rear end thereof.

The outer edge 37*a* of the rear spring portion 37 may be linear as a whole, may be a curve as a whole, or may have a shape of a combination of a straight line and a curve. The outer edge 37*a* of the rear spring portion 37 and the outer edge 36*a* of the parallel portion 36 may be continuous with a curve therebetween, or may be continuous with a corner therebetween. Similarly, the outer edge 37*a* of the rear spring portion 37 and the outer edge of the proximal portion 26 may be continuous with a curve therebetween, or may be continuous with a corner therebetween. Here, a middle portion of the outer edge 37*a* of the rear spring portion 37 forms a straight line, and both end portions thereof each form a curve.

In a view looking along the insertion direction of the press-fit terminal 20, the outward portion of the parallel portion 36 is formed in an arc surface 36*f* having an arc shape protruding outward. When the outward portion of the parallel portion 36 is formed into the arc surface 36*f*, the arc surface 36*f* is expected to contact the inner peripheral surface of the through hole 13 with a large area.

Figure 4:
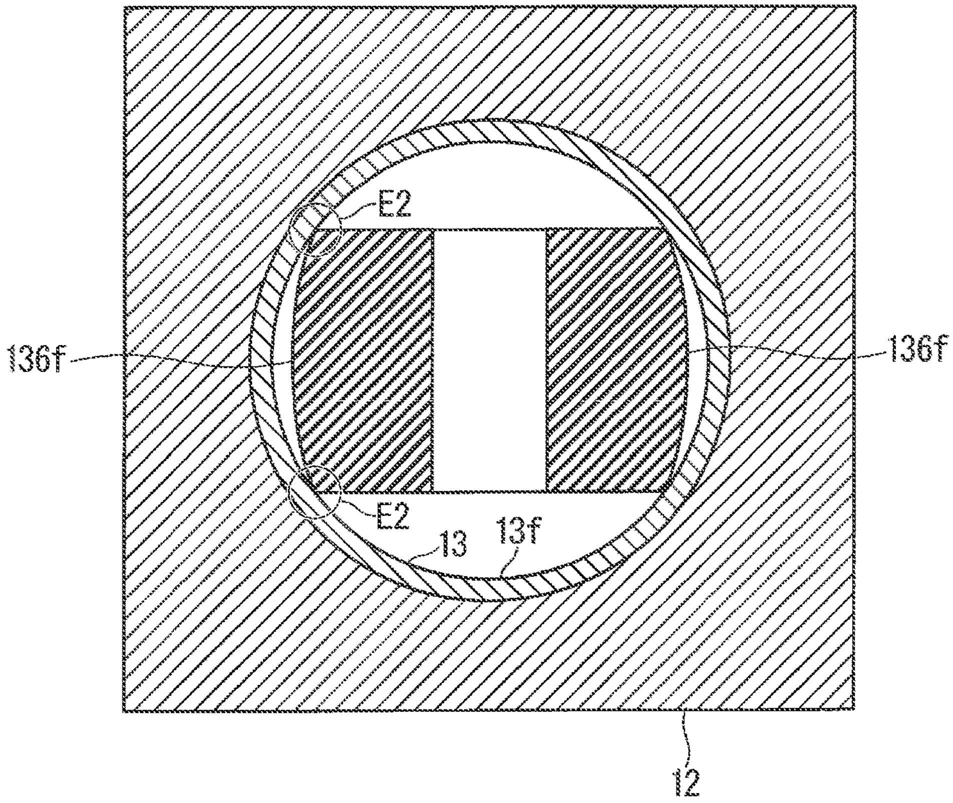
FIG. 4 is a cross-sectional view illustrating another press-fit terminal.

Radius of curvature r of the arc surface 36*f* is preferably equal to or smaller than an inner peripheral radius (ϕ/2) of the through hole 13 into which the press-fit terminal 20 is inserted. When the radius of curvature r of the arc surface 36*f* is the same as the inner peripheral radius (ϕ/2) of the through hole 13, the entire arc surface 36*f* is expected to contact the inner peripheral surface of the through hole 13. That the radius of curvature r of the arc surface 36*f* is the same as the inner peripheral radius (ϕ/2) of the through hole 13 may include that they are the same within the manufacturing error range. For example, the radius of curvature r of the arc surface 36*f* may be the same as the inner peripheral radius (ϕ/2) of the through hole 13 within an error range of ±20%, inclusive. Even when the radius of curvature r of the arc surface is smaller than the inner peripheral radius (ϕ/2) of the through hole 13, the curved surface portion at the center of the arc surface 36*f* is expected to contact the inner peripheral surface of the through hole 13 with a large area as compared with the case where the radius of curvature r of the arc surface 136*f* is larger than the inner peripheral radius (ϕ/2) of the through hole 13 (see range E1 in FIG. 3). For example, as illustrated in FIG. 4, when the radius of curvature r of the arc surface 136*f* is larger than the inner peripheral radius (ϕ/2) of the through hole 13, both edge portions of the arc surface 136*f* are assumed to contact the inner peripheral surface of the through hole 13 with an area smaller than that in the above case (see range E2 in FIG. 4). In a case where the radius of curvature r of the arc surface is smaller than the inner peripheral radius (ϕ/2) of the through hole 13, the radius of curvature r of the arc surface is preferably 70% or more of the inner peripheral radius (ϕ/2) of the through hole 13.

The outward portions of the front spring portion 35 and the rear spring portion 37 are also formed in an arc surface in the same manner as described above.

It is not essential that the outward portions of the parallel portion 36, the front spring portion 35, and the rear spring portion 37 are formed in the above-described shape in a view looking along the insertion direction of the press-fit terminal 20. For example, the outward portions of the parallel portion 36, the front spring portion 35, and the rear spring portion 37 may be formed in flat surfaces. As illustrated in FIG. 4, the case where the radius of curvature r of the are surface 136*f* is larger than the inner peripheral radius (ϕ/2) of the through hole 13 is not excluded.

The press-fit portion 30 is formed to have a thickness of 0.3 mm or more and 0.5 mm or less. Preferably, the thickness of the press-fit portion 30 is 0.4 mm. In this manner, forming the press-fit portion 30 to have a small thickness of 0.3 mm or more and 0.5 mm or less allows the press-fit portion 30 to be used for a small through hole 13. When downsizing of the through hole 13 and the press-fit portion 30 is realized, requirement for densification, multipolarization, and the like of the press-fit terminal 20 can be met.

The size and shape of each part of the press-fit portion 30 are as follows.

First, for the press-fit portion 30, when the length of the eyehole 31 is Le [mm] and the length of the parallel portion 36 is Ls [mm], Ls/Le is 0.57 or more and 0.65 or less. Here, the length Le [mm] of the eyehole 31 is a distance between the front end at the foremost and the rear end at the rearmost of the eyehole 31 along the front-rear direction. The length Ls [mm] of the parallel portion 36 is the length of the linear outer edge 36*a* of the parallel portion 36 along the front-rear direction.

In the press-fit portion 30, when the front spring strength and the rear spring strength calculated under the following conditions are respectively $G_1$ [$mm^3$] and $G_2$ [$mm^3$], $G_1/G_2$ is 0.55 or more and 1.45 or less.

[Conditions]

First, a position at 0.1 mm in the rearward direction from the front end of the eyehole 31 is a front reference SF. In FIG. 1, the front reference SF is indicated as a straight line orthogonal to the front-rear direction. Similarly, a position at 0.1 mm in the forward direction from the rear end of the eyehole 31 is a rear reference SR. In FIG. 1, the rear reference SR is indicated as a straight line orthogonal to the front-rear direction.

Front reference plane TF extending from the inner edge of the front spring portion 35 at the front reference SF and perpendicular to the outer edge 35*a* of the front spring portion 35 is assumed. Here, the front reference plane TF being perpendicular to the outer edge 35*a* of the front spring portion 35 means that the front reference plane TF is perpendicular to the outer edge 35*a* of the front spring portion 35 in a view looking the press-fit portion 30 along the thickness direction thereof. The second moment of area of the front spring portion 35 in the front reference plane TF is $I_1$ [$mm^4$].

Similarly, rear reference plane TR extending from the inner edge of the rear spring portion 37 at the rear reference SR and perpendicular to the outer edge 37*a* of the rear spring portion 37 is assumed, and the second moment of area of the rear spring portion 37 in the rear reference plane is $I_2$ [$mm^4$].

Among linear outer edges 36*a* of the parallel portion 36, the length in the insertion direction of the press-fit portion 30 from the end on the front spring portion 35 side to the front end of the eyehole 31 is $L_1$ [mm].

Among linear outer edges 36*a* of the parallel portion 36, the length in the insertion direction of the press-fit portion 30 from an end on the rear spring portion 37 side to the rear end of the eyehole 31 is $L_2$ [mm].

Front spring strength $G_1$ is defined as $I_1/L_1$ [$mm^3$], and rear spring strength $G_2$ is defined as $I_2/L_2$ [$mm^3$].

[Second Moment of Area]

The second moment of area in each of the front reference plane TF and the rear reference plane TR can be obtained, for example, as follows.

Figure 5:
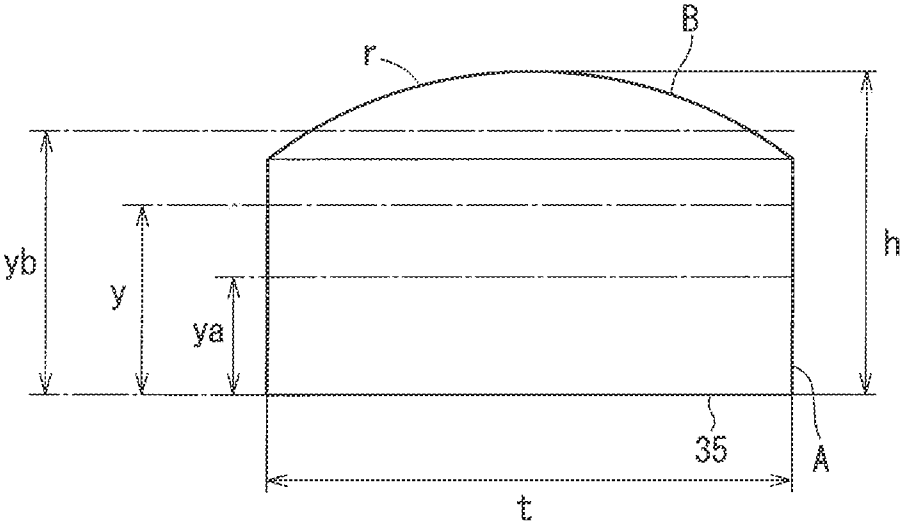
FIG. 5 is an explanatory view illustrating a cross-sectional shape of a front spring portion in a front reference plane.

The cross-sectional shape of the front spring portion 35 in the front reference plane TF is, for example, a shape in which a first portion A having a rectangular shape is combined with a second portion B that is a part cut out from a circle with a straight line as illustrated in FIG. 5. Therefore, the second moment of area in the front reference plane TF can be considered as the sum of the second moment of area of the first portion A and the second moment of area of the second portion B.

In this cross-sectional shape, when the thickness of the press-fit portion 30 is t [mm], the radius of curvature of the outward portion of the press-fit portion 30 is r [mm], and the dimension from the inward portion on the eyehole 31 side to the outward portion is a spring thickness h [mm], the second moment of area in the front reference plane TF is calculated by the following formula.

$$I = \{(y - y_a)^2 S_a + I_a\} + \{(y - y_b)^2 S_b + I_b\}$$

where $$I_a = \frac{t\left[h - r\left(1 - \sqrt{1 - (t/2)^2}\right)\right]^3}{12} \quad I_b = \frac{r^4}{24}\left\{6\sin^{-1}\frac{t}{2r} - 3\sin\left(2\sin^{-1}\frac{t}{2r}\right) - 2\right.$$

-continued $$\left.\left(\frac{t}{2r}\right)^2 \sin\left(2\sin^{-1}\frac{t}{2r}\right)\right\}$$

$$S_a = t\left[h - r\left\{1 - \sqrt{1 - (t/2)^2}\right\}\right] \quad S_b = \frac{r^2}{2}\left\{2\sin^{-1}\frac{t}{2r} - \sin\left(2\sin^{-1}\frac{t}{2r}\right)\right\}$$

$$y_a = \frac{h - r\left\{1 - \sqrt{1 - (t/2)^2}\right\}}{2} \quad y_b = \frac{4r}{3}\frac{(t/2r)^3}{2\sin^{-1}\frac{t}{2r} - \sin\left(2\sin^{-1}\frac{t}{2r}\right)} - (r - h)$$

$$y = \frac{S_a y_a + S_b y_b}{S_a + S_b}$$

In the above formula, $I_a$ is the second moment of area of the first portion A, and $I_b$, is the second moment of area of the second portion B. $S_a$ is the cross-sectional area of the first portion A, and $S_b$ is the cross-sectional area of the second portion B. Furthermore, $y_a$ is the position of the neutral axis of the first portion A, $y_b$ is the position of the neutral axis of the second portion B, and y is the position of the neutral axis of the whole combination of the first portion A and the second portion B.

The second moment of area in the rear reference plane TR can also be determined in the same manner as described above.

The method for obtaining the second moment of area is an example. The second moment of area can be obtained by a calculation method based on the cross-sectional shape of the front spring portion 35 in the front reference plane TF, the cross-sectional shape of the rear spring portion 37 in the rear reference plane TR, and the like.

In the press-fit terminal 20 configured as described above, Ls/Le is 0.57 or more and 0.65 or less, and $G_1/G_2$ is 0.55 or more and 1.45 or less, so that compatibility between reduction in insertion force and increasing of holding force are raised.

In the press-fit terminal 20 described above, when the spring strength G [$mm^3$] is $G_1+G_2$, G may be 0.03 $mm^3$ or more and 0.04 $mm^3$ or less. This further improves the compatibility between reduction in insertion force and increasing of holding force.

The outer edge 35*a* of the front spring portion 35 is inclined so as to be directed inward in the width direction of the press-fit portion 30 toward the front side, and the outer edge 37*a* of the rear spring portion 37 is inclined so as to be directed inward in the width direction of the press-fit portion 30 toward the rear side. Therefore, when the press-fit terminal 20 is press-fitted into the through hole 13, the front spring portion 35 and the rear spring portion 37 respectively having the outer edges 35*a* and 37*a*-inclined with respect to the parallel portion 36 can easily deform at both end sides of the parallel portion 36.

In addition, since the outward portion of the parallel portion 36 is formed in the arc surface 36*f*, the parallel portion 36 easily contacts the inner peripheral surface of the through hole 13 with a large surface, which further increases the contact area.

In particular, when the radius of curvature r of the arc surface 36*f* is equal to or smaller than the radius of the through hole 13, the central portion of the arc surface 36*f* easily contacts the inner peripheral surface of the through hole 13 with a relatively large area, which further increases the contact area.

Figure 6:
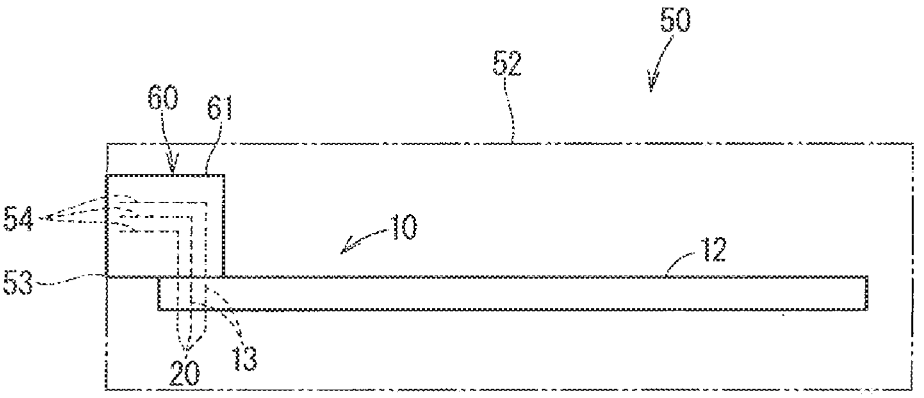
FIG. 6 is a schematic view illustrating a connector device.

FIG. 6 is a view illustrating a connector device 50 in which the press-fit terminal 20 is press-fitted into the substrate 12. The connector device 50 includes the substrate 12 and a connector 60. The connector 60 includes the press-fit terminal 20. In FIG. 6, a connector terminal portion 54 is integrally connected to the proximal portion 26 of the press-fit terminal 20. The connector terminal portion 54 is continuous with the proximal portion 26 in a bent state with respect to the proximal portion 26 (in this case, bent at a right angle). The proximal portion of the press-fit terminal 20 and the connector terminal portion 54 are incorporated in a connector housing 61 of the connector 60. The proximal portion may protrude from the connector housing 61. The connector terminal portion 54 is disposed so as to protrude from the bottom of a space in the connector housing 61 toward the opening. Here, a plurality of press-fit terminals 20 are incorporated in the connector housing 61. Therefore, a plurality of connector terminal portions 54 are arranged at an interval in the connector housing 61. A plurality of press-fit terminals 20 protrudes from an outer surface of the connector housing 61. A plurality of press-fit terminals 20 protruding from the outer surface of the connector housing 61 is press-fitted at a time into a plurality of through holes 13. The connector 60 is mounted and fixed to the substrate 12 in a state where a plurality of press-fit terminals 20 is press-fitted into a plurality of through holes 13.

A case 52 is formed in a housing shape having a space capable of accommodating the substrate 12. An opening 53 that exposes the connector housing 61 to the external is formed in the case 52. The substrate 12 is fixed in the case 52 with the connector housing 61 disposed at the opening 53. To fix the substrate 12 in the case 52, a screwing structure, a fitting structure, a combined structure thereof, or the like may be used.

In the connector device 50 as described above, a large number of connector terminal portions 54 may be incorporated into the connector 60. In this case, work of simultaneously press-fitting a large number of press-fit terminals 20 into the through holes 13 may be needed. Such a case is effective in that the maximum value of the insertion force can be reduced while increasing the contact load for a large number of the press-fit terminals 20.

When the radius of curvature r of the outward portion of the parallel portion 36 is equal to or smaller than the inner peripheral radius of the through hole 13, the contact area between the press-fit portion 30 and the inner peripheral surface of the through hole 13 is large.

EMBODIMENT EXAMPLES

In the present embodiment example, evaluation of insertion amount, holding force, and contact area of the press-fit terminal 20 described in the above embodiment will be described. The evaluation was derived by computer aided engineering (CAE) analysis using the finite element method.

The press-fit terminal 20 was evaluated with different values of Ls/Le, $G_1/G_2$, and G ($=G_1+G_2$). The thickness of the press-fit terminal 20 is 0.4 mm, and the diameter ϕ of the through hole 13 is 0.55 mm.

FIG. 7 shows evaluation results. As shown in the figure, in Embodiment Examples 1 and 2 in which Ls/Le is 0.57 or more and 0.65 or less and $G_1/G_2$ is 0.55 or more and 1.45 or less, it can be understood that reduction in the insertion force may be compatible with increasing of the holding force and the contact area at high levels. For example, it can be understood that Embodiment Examples 1 and 2 can realized an insertion force of 63 N or less, a holding force of 20 N or more, and a contact area of 0.49 $mm^2$ or more. In addition to this condition, even when G ($=G_1+G_2$) is 0.03 $mm^3$ or more and 0.04 $mm^3$ or less, reduction in the insertion force may be compatible with increasing of the holding force and the contact area at high levels. Furthermore, when G ($=G_1+G_2$) is 0.034 $mm^3$ or more and 0.037 mm 3 or less, it can be estimated that reduction in the insertion force may be compatible with increasing of the holding force and the contact area at high levels.

The configurations described in the above embodiments and modifications can be appropriately combined as long as they do not cause any contradiction.

DESCRIPTION OF REFERENCE SIGNS

12: substrate
13: through hole
**13*f***: conductive layer
20: press-fit terminal
22: distal portion
**22*a***: most distal portion
26: proximal portion
30: press-fit portion
31: eyehole
34: contact piece
35: front spring portion
**35*a*, 36*a*, 37*a***: outer edge
36: parallel portion
**36*f*, 136*f***: arc surface
37: rear spring portion
50: connector device
52: case
53: opening
54: connector terminal portion
60: connector
61: connector housing
A: first portion
B: second portion
TF: front reference plane
TR: rear reference plane

The invention claimed is:

1. A press-fit terminal that is press-fitted into a through hole formed in a substrate, the press-fit terminal comprising a press-fit portion including two contact pieces facing each other with an eyehole interposed therebetween, wherein:

each of the two contact pieces includes a parallel portion, a front spring portion extending from the parallel portion in a direction in which the press-fit portion is inserted, and a rear spring portion extending from the parallel portion in a direction opposite to the direction in which the press-fit portion is inserted, the parallel portions being parallel to each other, a thickness of the press-fit portion is 0.3 mm or more and 0.5 mm or less, in the press-fit portion, when Le [mm] is a length of the eyehole and Ls [mm] is a length of the parallel portion, Ls/Le is 0.57 or more and 0.65 or less, and in the press-fit portion, when $G_1$ [$mm^3$] is a front spring strength and $G_2$ [$mm^3$] is a rear spring strength calculated under conditions defined below, $G_1/G_2$ is 0.55 or more and 1.45 or less:

[Conditions]

a direction in which the press-fit terminal is inserted is a forward direction, and a direction opposite to the direction in which the press-fit terminal is inserted is a rearward direction;

a position at 0.1 mm in the rearward direction from a front end of the eyehole is a front reference, and a position at 0.1 mm in the forward direction from a rear end of the eyehole is a rear reference;

assuming a front reference plane extending from an inner edge of the front spring portion at the front reference and perpendicular to an outer edge of the front spring portion, second moment of area of the front spring portion in the front reference plane is $I_1$ [$mm^4$];

assuming a rear reference plane extending from an inner edge of the rear spring portion at the rear reference and perpendicular to an outer edge of the rear spring portion, second moment of area of the rear spring portion in the rear reference plane is $I_2$ [$mm^4$];

a length in the insertion direction of the press-fit portion from an end, on a side of the front spring portion, of a linear outer edge of the parallel portion to the front end of the eyehole is $L_1$ [mm];

a length in the insertion direction of the press-fit portion from an end, on a side of the rear spring portion, of the linear outer edge of the parallel portion to the rear end of the eyehole is $L_2$ [mm];

the front spring strength $G_1$ is $I_1/L_1$ [$mm^3$], and the rear spring strength $G_2$ is $I_2/L_2$ [$mm^3$].

2. The press-fit terminal according to claim 1, wherein when spring strength G [$mm^3$] is $G_1+G_2$, G is 0.03 $mm^3$ or more and 0.04 $mm^3$ or less.

3. The press-fit terminal according to claim 1, wherein the outer edge of the front spring portion is inclined so as to be directed inward in a width direction of the press-fit portion toward a front side, and the outer edge of the rear spring portion is inclined so as to be directed inward in the width direction of the press-fit portion toward the rear side.

4. The press-fit terminal according to claim 1, wherein an outward portion of the parallel portion is formed in an arc shape in a view looking along the insertion direction.

5. A connector device comprising:

a connector including the press-fit terminal according to claim 4; and a substrate in which a through hole is formed, wherein the press-fit portion of the press-fit terminal is press-fitted into the through hole, and a radius of curvature of the outward portion of the parallel portion is equal to or smaller than an inner peripheral radius of the through hole in a view looking along the insertion direction.

* * * * *